United States Patent
Ehlers

(10) Patent No.: US 7,357,829 B2
(45) Date of Patent: Apr. 15, 2008

(54) DIESEL PARTICULATE FILTER CLEANING DEVICE AND METHOD

(75) Inventor: Mark S. Ehlers, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 187 days.

(21) Appl. No.: 11/328,946

(22) Filed: Jan. 10, 2006

(65) Prior Publication Data

US 2007/0157809 A1   Jul. 12, 2007

(51) Int. Cl.
*B01D 29/66* (2006.01)
*B01D 41/04* (2006.01)

(52) U.S. Cl. ............... 95/279; 95/280; 55/294; 55/302; 55/303

(58) Field of Classification Search ............ 95/278, 95/279, 280; 55/283, 294, 301, 302, 303, 55/DIG. 30; 60/281, 310, 317
See application file for complete search history.

(56) References Cited

U.S. PATENT DOCUMENTS

| | | | |
|---|---|---|---|
| 5,013,340 A * | 5/1991 | Taslim et al. | 55/290 |
| 5,253,476 A * | 10/1993 | Levendis et al. | 60/279 |
| 5,390,492 A * | 2/1995 | Levendis | 60/278 |
| 5,397,550 A * | 3/1995 | Marino, Jr. | 422/178 |
| 5,426,936 A * | 6/1995 | Levendis et al. | 60/278 |
| 5,520,366 A | 5/1996 | Elliott | |
| 5,595,581 A * | 1/1997 | Ichikawa et al. | 55/302 |
| 5,616,171 A * | 4/1997 | Barris et al. | 95/280 |
| 5,634,952 A * | 6/1997 | Kasai et al. | 55/302 |
| 6,641,646 B2 * | 11/2003 | Rosenberg | 95/280 |
| 7,025,811 B2 * | 4/2006 | Streichsbier et al. | 95/279 |
| 2006/0070359 A1* | 4/2006 | Sellers et al. | 55/303 |
| 2006/0201326 A1* | 9/2006 | Wagner et al. | 95/280 |

* cited by examiner

*Primary Examiner*—Duane Smith
*Assistant Examiner*—Robert A Clemente
(74) *Attorney, Agent, or Firm*—Jeffrey P. Calfa; Gerald W. Askew

(57) ABSTRACT

Multiple storage tanks and multiple valves that open simultaneously allow gas charges stored at superatmospheric pressure in the tanks to simultaneously discharge and form a single substantial percussion pulse that dislodges particulate matter from a diesel particulate filter.

9 Claims, 2 Drawing Sheets

FIG. 4
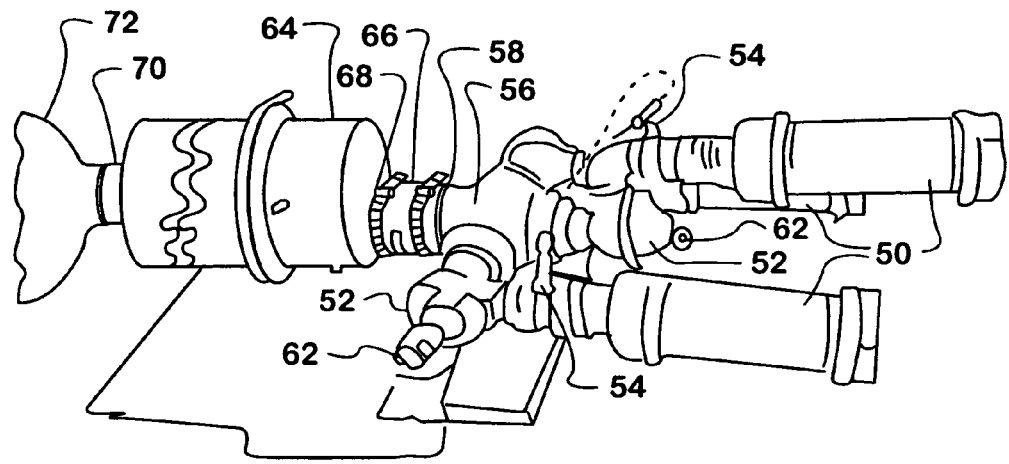
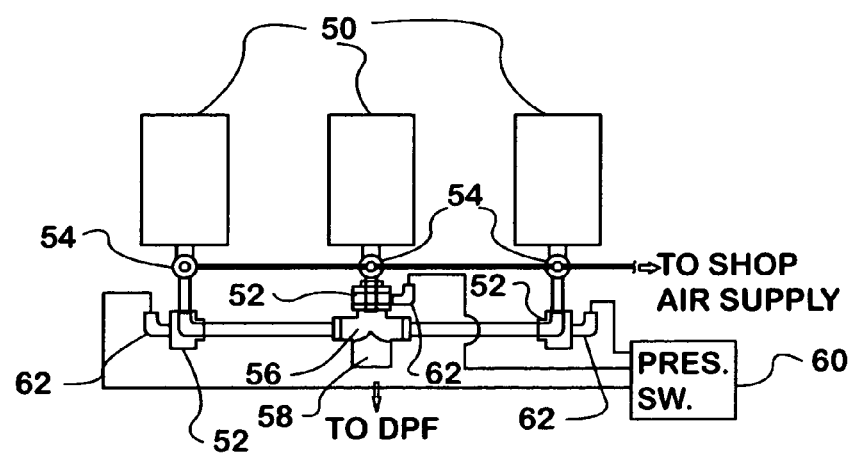
FIG. 5

DIESEL PARTICULATE FILTER CLEANING DEVICE AND METHOD

FIELD OF THE INVENTION

This invention relates devices and methods for mechanically removing trapped particulate matter from diesel particulate filters (DPF's) that are used in diesel engine exhaust systems.

BACKGROUND OF THE INVENTION

A known system for treating exhaust gas passing through an exhaust system of a diesel engine comprises a diesel oxidation catalyst (DOC) associated with a diesel particulate filter (DPF). The combination of these two exhaust gas treatment devices promotes chemical reactions in exhaust gas and traps diesel particulate matter (DPM) as exhaust flows through the exhaust system from the engine, thereby preventing significant amounts of pollutants such as hydrocarbons, carbon monoxide, soot, SOF, and ash, from entering the atmosphere.

While an engine is running, the existence of certain conditions enables regeneration of a DPF to be initiated. Various techniques are available for developing temperatures sufficiently high to initiate regeneration and thereafter control on-going regeneration. Regeneration is essentially a chemical process that burns off trapped DPM. For any of various reasons, not all trapped DPM may be burned off by regeneration. Moreover, the burning of trapped DPM may contribute to the build-up of ash, a non-combustible particulate.

Consequently, it may be either necessary or desirable to occasionally use a mechanical, rather than a chemical, process to remove particulate matter, such as DPM and/or ash, from a DPF. The use of compressed air has been proposed as one way to remove the particulate matter.

Compressed air is an appropriate medium because it is readily available in service facilities and shops and it is environmentally friendly.

Cleaning a DPF by compressed air has involved certain manual operations such as removing the actual filter module from a casing and manually manipulating a compressed air nozzle across a face of the module. Dislodged matter is ejected from an opposite face and collected in some type of collector for subsequent disposal.

In light of this background, it is believed that improvements in the mechanical cleaning of diesel particulate filters would enjoy commercial acceptance. For example, a cleaning device and method that would minimize the amount of labor required would be beneficial. Likewise, a device and method that could clean a diesel particulate filter more thoroughly would be desirable. The ability to satisfactorily clean a diesel particulate filter without having to remove the actual filter module from its casing also would have obvious advantages.

SUMMARY OF THE INVENTION

It has been discovered that a device that provides a succession of compressed air pulses, or percussion pulses, can provide improvements for mechanically cleaning the trapping medium of a diesel particulate filter.

The pulses can be created from an available compressed air source, such as shop air, using a novel DPF cleaning device in accordance with principles of the present invention. The device comprises at least one storage tank and an associated valve.

While general principles of the device are not dependent on any particular number of storage tanks and valves used to create percussion pulses, one particular embodiment of the inventive device comprises multiple storage tanks and multiple valves that open simultaneously to allow gas charges stored at superatmospheric pressure in the tanks to simultaneously discharge and form a single substantial percussion pulse.

It has been discovered that for developing percussion pulses effective to dislodge trapped particulates from a diesel particulate filter trapping medium, the total cost of multiple smaller valves is less than that of a single larger valve that would produce comparable pulses.

One generic aspect of the present invention relates to a method for dislodging trapped particulate matter from a diesel particulate filter.

The method comprises a) charging a storage tank with a gas to superatmospheric pressure; b) placing a face at one end of a flow path through a trapping medium of the diesel particulate filter in communication with the superatmospheric gas charge in the storage tank via a gas flow path containing a valve that is selectively operable to a closed condition closing the flow path and to an open condition opening the flow path and that comprises a diaphragm to which the superatmospheric gas charge in the storage tank is applied to provide force for unseating a valve element from a seat when the valve operates from closed condition to open condition; c) operating the valve from closed condition to open condition to allow the gas charge in the storage tank to discharge through the gas flow path and the flow path through the trapping medium and maintaining the open condition long enough to allow a majority of the gas charge to discharge; and d) repeating steps a), b), and c).

Another generic aspect relates to a device for mechanically removing trapped particulate matter from a diesel particulate filter that is used in a diesel engine exhaust system.

The device comprises: a storage tank capable of being charged with a gas to superatmospheric pressure; a flow path containing a valve that is selectively operable to a closed condition closing the flow path and to an open condition opening the flow path for delivering a charge of gas from the storage tank to a face at one end of a flow path through a trapping medium of the diesel particulate filter when the valve operates from closed condition to open condition; the valve comprising a diaphragm to which the superatmospheric gas charge in the storage tank is applied to provide force for unseating a valve element from a seat when the valve operates from closed condition to open condition; and an operator for operating the valve from closed condition to open condition, and maintaining open condition long enough, to allow a majority of the gas charge in the storage tank to discharge through the gas flow path and the flow path through the trapping medium.

The foregoing, along with further features and advantages of the invention, will be seen in the following disclosure of a presently preferred embodiment of the invention depicting the best mode contemplated at this time for carrying out the invention. This specification includes drawings, now briefly described as follows.

BRIEF DESCRIPTION OF THE DRAWINGS

FIG. 4 is a perspective view of still another embodiment of cleaning device that embodies principles of the invention.

FIG. 5 is a schematic diagram representative of FIG. 4.

DESCRIPTION OF THE PREFERRED EMBODIMENT

Figure 1:
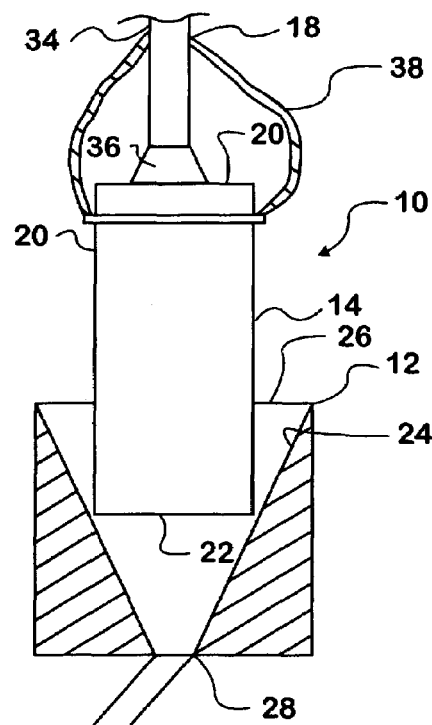
FIG. 1 is a diagram, partly in cross section, of a portion of one embodiment of cleaning device that embodies principles of the invention.

FIG. 1 shows a first embodiment of DPF cleaning device 10 comprising a receiver 12 for holding a trapping medium 14 of a DPF during cleaning, a collector 16 for collecting particulate matter dislodged from trapping medium 14 during cleaning, and a portion of a percussion air pulse delivery system 18 for delivering percussion air pulses to medium 14 to dislodge trapped particulate matter.

Medium 14 has a cylindrical shape that fits inside a casing (not shown in FIG. 1) of the DPF, and hence FIG. 1 shows medium 14 having been removed from the casing. Medium 14 has opposite end faces 20, 22, one of which is an inlet and the other of which is an outlet. As engine exhaust gases flow through an engine exhaust system, they enter the DPF casing through an inlet port and then pass through a flow path in medium 14 between the end faces, with medium 14 trapping DPM in the process. After having passed through the medium, the treated exhaust exits the casing through an outlet port.

Receiver 12 comprises a conical shaped inner wall 24. One end of medium 14 is inserted upright into receiver 12 through the wider open end 26 of wall 24 to place the perimeter of the medium at end 22 in abutment with wall 24. The narrower open end 28 of wall 24 opposite end 26 is communicated to an entrance 30 of collector 16 through a passageway 32.

Air pulse delivery system 18 comprises a device for creating percussion air pulses that are capable of dislodging trapped particulate matter from medium 14. FIG. 1 shows only the portion of system 18 that directly associates with medium 14. That portion comprises a movable conduit 34 that includes a conical nozzle 36 at one end. The opposite end that is not shown connects to the device that creates the percussion pulses.

For cleaning medium 14, nozzle 36 is placed against end face 20 and moved manually across the end face while percussion pulses are delivered through conduit 34 and nozzle 36. To prevent particulates from being blown into the air from end face 20, an encasement bag 38 is associated with conduit 34 and medium 14. Bag 38 comprises a flexible, imperforate sleeve of suitable material. One end of the sleeve is sealed around the outside of conduit 34 and the opposite end around the outside of medium 14. The size and flexibility of the sleeve allow the user to manipulate the nozzle over the entire end face of the medium as percussion air pulses are delivered.

The percussion pulses enter the flow path through medium 14 where DPM is trapped. The percussion forces act to dislodge the trapped matter and carry it through the medium to the other end face where they are further conveyed via passageway 32 to collector 16.

Collector 16 may be any suitable collection device that will hold the dislodged particulates until time of disposal. One example is a passive device such as a container or bag that is appropriately vented without allowing escape of particulates. Another example is an active device such as a vacuum that aids in drawing particulates into itself.

Figure 2:
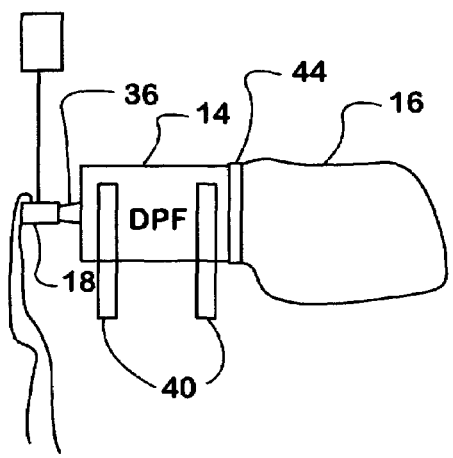
FIG. 2 is a diagram, partly in cross section, of a portion of another embodiment of cleaning device that embodies principles of the invention.
Figure 3:
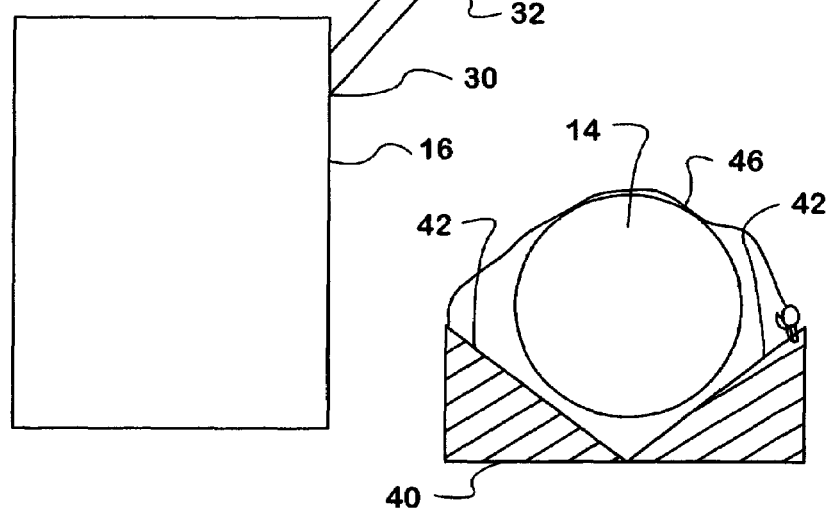
FIG. 3 is an enlarged cross section view taken along line 3-3 in FIG. 2.

FIGS. 2 and 3 show another embodiment that is substantially similar to that of FIG. 1. One difference is that the trapping medium 14 is supported generally horizontally by a saddle that is shown to comprise two separate, spaced apart saddle elements 40. The saddle elements comprise tapered walls 42 on which the sidewall of medium 14 rests at opposite sides of an imaginary vertical plane through the axial centerline of the medium.

In this instance the collector 16 is shown as a flexible bag that is open at one end for fitting over an end face of the medium. Where the bag overlaps the medium, a band 44 seals the bag to the medium to prevent escape of particulates coming out of that end during cleaning. Medium 14 is held secure in the saddle by strapping it in place using one or more straps 46, as shown in FIG. 3. Bag 38 is not specifically shown in FIG. 2.

The use of tapered walls 42 and conical wall 24 allow a single cleaning device to be used to clean trapping media having different diameters and lengths.

The complete percussion air pulse delivery system 18 is shown by FIGS. 4 and 5. The disclosed embodiment comprises three air storage tanks 50, three valves 52, and various pipes and fittings. Tanks 50 store charges of air in suitable volume and at suitable superatmospheric pressure to enable suitable percussion air pulses to be delivered to medium 14. Tanks 50 are each 12" long by 4" in diameter. They are capable of safely holding air at pressures in excess of 125 psi, which is a typical storage pressure.

Any suitable air source can be used to charge tanks 50, such as shop air. In typical automotive service facilities shop air is readily available at sufficiently high pressure, but as the inventor has found, not in sufficient volume to create percussion pulses suitable for dislodging trapped particulates from a DPF.

Shop air is delivered to tanks 50 via charging ports 54. Each charging port 54 comprises a respective fitting connected in a respective pipe running between a respective tank and the inlet port of a respective valve 52.

Each valve 52 further comprises a respective outlet port that is communicated to a respective inlet of a fitting 56 that has a 4" diameter outlet 58. It is through outlet 58 that the percussion pulses are delivered to medium 14.

For developing percussion pulses, valves 52 must be capable of opening simultaneously and almost instantly. A valve that is capable of doing so is described in U.S. Pat. No. 5,520,366 "Rapid Pulse Delivery Diaphragm Valve", the entirety of which is incorporated herein by reference. Such a valve is normally closed and comprises a solenoid that is actuated by electricity to open the valve. The valve has a diaphragm that is held seated on a valve seat closing the valve when the solenoid is not actuated. When the solenoid is actuated, the hold on the seat is released. Fast opening of the valve is accomplished by using the pressure of air present at the valve inlet to lift the diaphragm off the seat.

U.S. Pat. No. 5,520,366 says that the valve is used to create a reverse jet pulse for shaking dust off dust collection filter bags. While the compressed air source is not described in detail, it is understood from the patent that the solenoid does not remain energized long enough to allow the compressed air source to lose any significant pressure.

FIG. 5 shows a pressure switch 60 that senses air pressure in tanks 50 as the tanks are being charged from the shop air supply with valves 52 closed. When a predetermined pressure is reached, such as 125 psi for example, the switch trips. This completes an electric circuit to each solenoid 62 of each valve 52, causing each valve to open. With the valves opening essentially simultaneously and instantly, the stored charges in the tanks are suddenly released through valves 54 and into fitting 56 to form a combined percussion pulse that is delivered through outlet 58.

FIG. 4 shows a DPF being cleaned using the device that has just been described. Here, the trapping medium remains inside a casing 64. A short hose 66 is fit over outlet 58 and an outlet port of casing 64 and held clamped at each place by a respective hose clamp 68 so that the percussion pulse can propagate through the casing outlet port and into the interior of the casing. There, it is constrained to continue through the trapping medium, dislodging trapped particulates in the process. After passing through the trapping medium, the pulse exits the casing through an inlet port 70 and carries dislodged particulates into a collection bag 72.

As the compressed air charges are released from the tanks and propagate through the device to form the pulse that passes through the DPF, energy is gradually lost and the intensity of the pulse dissipates. As a cautionary measure, a relief valve may be placed ahead of the DPF to vent excess pressure that might be unsuitable for application to the DPF.

Pressure switch 60 is a commercially available device that has an adjustment feature allowing the pressure at which it closed to be set to any desired pressure within a range of pressures. One example of representative range is 20 psi to 120 psi. At lower settings, DPF cleaning device 10 delivers weaker pulses more rapidly; at higher settings, more powerful pulses less frequently. Switch 60 opens at some pressure lower than the pressure at which it closes to provide for a majority of the superatmospheric charges in the tanks to discharge and form a percussion pulse. The pressure at which the switch opens should be somewhat greater than atmospheric pressure to assure switch opening.

While a presently preferred embodiment of the invention has been illustrated and described, it should be appreciated that principles of the invention apply to all embodiments falling within the scope of the following claims.

What is claimed is:

1. A method for dislodging trapped particulate matter from a diesel particulate filter, the method comprising:
   a) charging a storage tank with a gas to superatmospheric pressure;
   b) placing a face at one end of a flow path through a trapping medium of the diesel particulate filter in communication with the superatmospheric gas charge in the storage tank via a gas flow path containing a valve that is selectively operable to a closed condition closing the flow path and to an open condition opening the flow path and that comprises a diaphragm to which the superatmospheric gas charge in the storage tank is applied to provide force for unseating a valve element from a seat when the valve operates from closed condition to open condition;
   c) operating the valve from closed condition to open condition to allow the gas charge in the storage tank to discharge through the gas flow path and the flow path through the trapping medium and maintaining the open condition long enough to allow a majority of the charge in the tank to discharge;
   and d) repeating steps a), b), and c);
   including placing a face at an opposite end of the flow path through the trapping medium in communication with a particulate collector and collecting particulate matter dislodged from the medium by the discharge of the gas charge through the trapping medium;
   wherein the step of placing a face at an opposite end of the flow path through the trapping medium in communication with a particulate collector comprises communicating the interior of a filter bag to the face at the opposite end of the flow path through the trapping medium to collect articulate matter in the interior of the bag; and
   including placing the trapping medium in a saddle capable of holding trapping media having different diameters, and using one or more straps to secure the trapping medium in the cradle.

2. A method as set forth in claim 1 including applying vacuum to an exterior surface of the filter bag to aid in drawing particulate matter into the bag interior.

3. A method as set forth in claim 1 wherein the step of placing a face at an opposite end of the flow path through the trapping medium in communication with a particulate collector and collecting particulate matter dislodged from the medium by the discharge of the gas charge through the trapping medium comprises inserting the opposite end of the trapping medium into abutment with a conical wall of a receiver and drawing particulate matter out of the receiver and into the particulate collector through an outlet passage in the receiver that is open to the narrow end of the conical wall.

4. A method as set forth in claim 1 wherein the trapping medium is disposed within the interior of a casing having an inlet port and an outlet port, and the step of placing a face at one end of a flow path through a trapping medium of the diesel particulate filter in communication with the superatmospheric gas charge in the storage tank via a gas flow path comprises placing the face at one end of the flow path through the trapping medium in communication with the superatmospheric gas charge in the storage tank via one of the casing ports.

5. A method as set forth in claim 4 including communicating a face at an opposite end of the flow path through the trapping medium with a particulate collector via the other of the casing ports and collecting particulate matter dislodged from the medium by the discharge of the gas charge through the trapping medium after passage of the particulate matter through the other casing port.

6. A method for dislodging trapped particulate matter from a diesel particulate filter, the method comprising:
   a) charging a storage tank with a gas to superatmospheric pressure;
   b) placing a face at one end of a flow path through a trapping medium of the diesel particulate filter in communication with the superatmospheric gas charge in the storage tank via a gas flow path containing a valve that is selectively operable to a closed condition closing the flow path and to an open condition opening the flow path and that comprises a diaphragm to which the superatmospheric gas charge in the storage tank is applied to provide force for unseating a valve element from a seat when the valve operates from closed condition to open condition;
   c) operating the valve from closed condition to open condition to allow the gas charge in the storage tank to discharge through the gas flow path and the flow path through the trapping medium and maintaining the open condition long enough to allow a majority of the charge in the tank to discharge;

and d) repeating steps a), b), and c);

wherein the step of placing a face at one end of a flow path through a trapping medium of the diesel particulate filter in communication with the superatmospheric gas charge in the storage tank via a gas flow path comprises communicating an end of a movable conduit to the face at the one end of the flow path through the trapping medium, sealing one end of a flexible encasement bag to the end of the conduit, sealing an opposite end of the encasement bag to the trapping medium, and moving the end of the conduit to different locations on the face at the one end of the flow path through the trapping medium during successive occurrences of steps a), b), and c).

7. A method for dislodging trapped particulate matter from a trapping medium of a diesel particulate filter, the method comprising:
   a) removing the trapping medium from a casing of the diesel particular filter;
   b) placing the removed trapping medium in a saddle capable of holding trapping media having different diameters;
   c) using one or more straps to secure the trapping medium in the cradle; and
   d) with the trapping medium strapped in the cradle, communicating a source of pressurized gas to a face of the trapping medium to cause gas to flow from the source through the trapping medium.

8. A method as set forth in claim 7 wherein step d) comprises communicating an end of a movable conduit to the face of the trapping medium, sealing one end of a flexible encasement bag to the end of the conduit, sealing an opposite end of the encasement bag to the trapping medium, and moving the end of the conduit to different locations on the face of the trapping medium.

9. A method for dislodging trapped particulate matter from a trapping medium of a diesel particulate filter, the method comprising:

communicating a source of pressurized gas to a face of the trapping medium to cause gas to flow from the source through the trapping medium by placing an end of a movable conduit to the face of the trapping medium, sealing one end of a flexible encasement bag to the end of the conduit, sealing an opposite end of the encasement bag to the trapping medium, and moving the end of the conduit to different locations on the face of the trapping medium.

* * * * *